US008842834B2

(12) United States Patent
Chamberlain et al.

(10) Patent No.: US 8,842,834 B2
(45) Date of Patent: Sep. 23, 2014

(54) ROBUST DELIVERY OF PACKET BASED SECURE VOICE

(75) Inventors: Mark Chamberlain, Honeoye Falls, NY (US); John Alvermann, Victor, NY (US); Leonard Picone, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1883 days.

(21) Appl. No.: 11/725,541

(22) Filed: Mar. 19, 2007

(65) Prior Publication Data

US 2008/0232589 A1    Sep. 25, 2008

(51) Int. Cl.
*H04K 1/00* (2006.01)
*H04L 29/06* (2006.01)
*H04L 1/00* (2006.01)
*H04L 1/08* (2006.01)

(52) U.S. Cl.
CPC .. *H04L 1/08* (2013.01); *H04K 1/00* (2013.01); *H04L 1/0041* (2013.01); *H04L 1/0072* (2013.01); *H04L 1/0045* (2013.01)
USPC .......................................... 380/275; 713/153

(58) Field of Classification Search
CPC ........... H04K 1/00; H04L 1/0041; H04L 1/08
USPC .................. 380/275, 275.276, 274, 276, 277; 370/474; 713/170, 160, 153, 154
See application file for complete search history.

(56) References Cited

U.S. PATENT DOCUMENTS

| 4,757,536 | A | | 7/1988 | Szczutkowski et al. |
|---|---|---|---|---|
| 5,185,796 | A | | 2/1993 | Wilson |
| 5,432,754 | A | * | 7/1995 | Brady et al. .................. 367/134 |
| 5,742,756 | A | * | 4/1998 | Dillaway et al. ................ 726/20 |
| 7,007,218 | B2 | | 2/2006 | Chamberlain |
| 7,694,876 | B2 | * | 4/2010 | Barnes et al. .................. 235/377 |
| 7,747,021 | B2 | * | 6/2010 | Lindteigen et al. ........... 380/274 |
| 2002/0066012 | A1 | * | 5/2002 | Relander et al. .............. 713/151 |
| 2003/0120990 | A1 | * | 6/2003 | Elbwart et al. ................ 714/748 |
| 2005/0110615 | A1 | * | 5/2005 | Deguchi et al. ............ 340/10.51 |
| 2006/0112272 | A1 | * | 5/2006 | Morioka et al. ............... 713/171 |
| 2006/0239458 | A1 | * | 10/2006 | Bicksler et al. ............... 380/221 |
| 2008/0062987 | A1 | * | 3/2008 | Elmasry ....................... 370/392 |
| 2008/0148384 | A1 | * | 6/2008 | Adhikari et al. ................ 726/13 |
| 2008/0209298 | A1 | * | 8/2008 | Chae et al. ..................... 714/748 |
| 2008/0268906 | A1 | * | 10/2008 | Ohmoto ....................... 455/558 |
| 2008/0317018 | A1 | * | 12/2008 | Horvath et al. ............... 370/389 |
| 2009/0023474 | A1 | * | 1/2009 | Luo et al. ...................... 455/557 |
| 2010/0145819 | A1 | * | 6/2010 | Park ............................... 705/26 |

(Continued)

OTHER PUBLICATIONS

David Chase, Code-comibing- a maximum -likelihood decoding approach for comibing an arbitrary number of noisy packets, May 1985, vol. com-33, IEEE.*

(Continued)

*Primary Examiner* — Abu Sholeman
(74) *Attorney, Agent, or Firm* — Harness, Dickey & Pierce, P.L.C.

(57) ABSTRACT

A method is provided for transmitting voice data in a secure communication system. The method includes: transmitting voice data using a plurality of data packets; embedding a cryptographic message indicator into each of the plurality of data packets; and correcting for bit errors in the cryptographic message indicator at a packet receiver using code-combining across two or more of the data packets.

21 Claims, 5 Drawing Sheets

(56) References Cited

U.S. PATENT DOCUMENTS

| | | | |
|---|---|---|---|
| 2010/0304794 A1* | 12/2010 | Beninghaus et al. | 455/574 |
| 2010/0327054 A1* | 12/2010 | Hammad | 235/375 |
| 2011/0020026 A1* | 1/2011 | Yoshihara | 399/80 |
| 2011/0047371 A1* | 2/2011 | Timby | 713/153 |
| 2012/0018506 A1* | 1/2012 | Hammad et al. | 235/375 |
| 2013/0233931 A1* | 9/2013 | Narendra et al. | 235/492 |
| 2013/0251150 A1* | 9/2013 | Chassagne | 380/270 |
| 2013/0322622 A1* | 12/2013 | Bailey et al. | 380/44 |
| 2014/0194070 A1* | 7/2014 | DeLuca et al. | 455/68 |

OTHER PUBLICATIONS

David Chase, Code combing a maximum likelihood decoding approch for combining an arbitrary number of noisy packets, May 1985, IEEE, pp. 385-393.*

S.M. Little et al "Designing a Moderately Spread Mode for VLF Communications", XP010002932, Sep. 30, 1990.

M. Chamberlain et al "HF Data Link Protocol RF Simulator Performance Based on Stanag 4538 and Stanag 4539", 2003 IEEE US, vol. 1, Oct. 13, 2003.

* cited by examiner

ROBUST DELIVERY OF PACKET BASED SECURE VOICE

FIELD

The present disclosure relates to radio communication systems and, more particularly, to a technique for securely transmitting voice data in data packets.

BACKGROUND

During the past decade, the growth of the Internet has significantly impacted the area of telecommunications. For instance, it has demonstrated the power of seamless connectivity and the benefits gained from establishing common interfaces and protocols. Today, Internet is starting to embrace the challenges presented by a wireless world. Many of these challenges are the same as those encountered in a modern military communication system, such as the demand for seamless connectivity and secure communications links, to name a few. Successful military communication equipment will embrace this technology by building on the technological base established from enormous investments in the commercial sector.

In the context of military radio applications, there is a need to delivery voice data in packet form to enable seamless connectivity to the Internet infrastructure. However, the voice data must also be delivered robustly and securely in a tactical environment which produces high bit error rates. This disclosure presents an innovative technique for securely transmitting voice data in packet form. The statements in this section merely provide background information related to the present disclosure and may not constitute prior art.

SUMMARY

A method for transmitting voice data in a secure communication system. The method includes: transmitting voice data using a plurality of data packets; embedding a cryptographic message indicator into each of the plurality of data packets used to transmit the voice data; and correcting for bit errors in the cryptographic message indicator at a packet receiver using code-combining across two or more of the data packets.

In another aspect of this disclosure, the method for decoding voice data is further defined as follows: demodulating an encoded data packet into a plurality of bit soft-decisions; code combining bit soft-decisions associated with packet routing data and a cryptographic message indicator with bit soft-decision from previously received data packets to form a code-combining history; decoding the data packet using the code-combining history and the bit soft-decisions associated with the voice data; performing a redundancy check on the decoded cryptographic message indicator; and passing the decoded cryptographic message indicator to the cryptographic engine when the decoded cryptographic message indicator passes the redundancy check.

Further areas of applicability will become apparent from the description provided herein. It should be understood that the description and specific examples are intended for purposes of illustration only and are not intended to limit the scope of the present disclosure.

DETAILED DESCRIPTION

Figure 1:
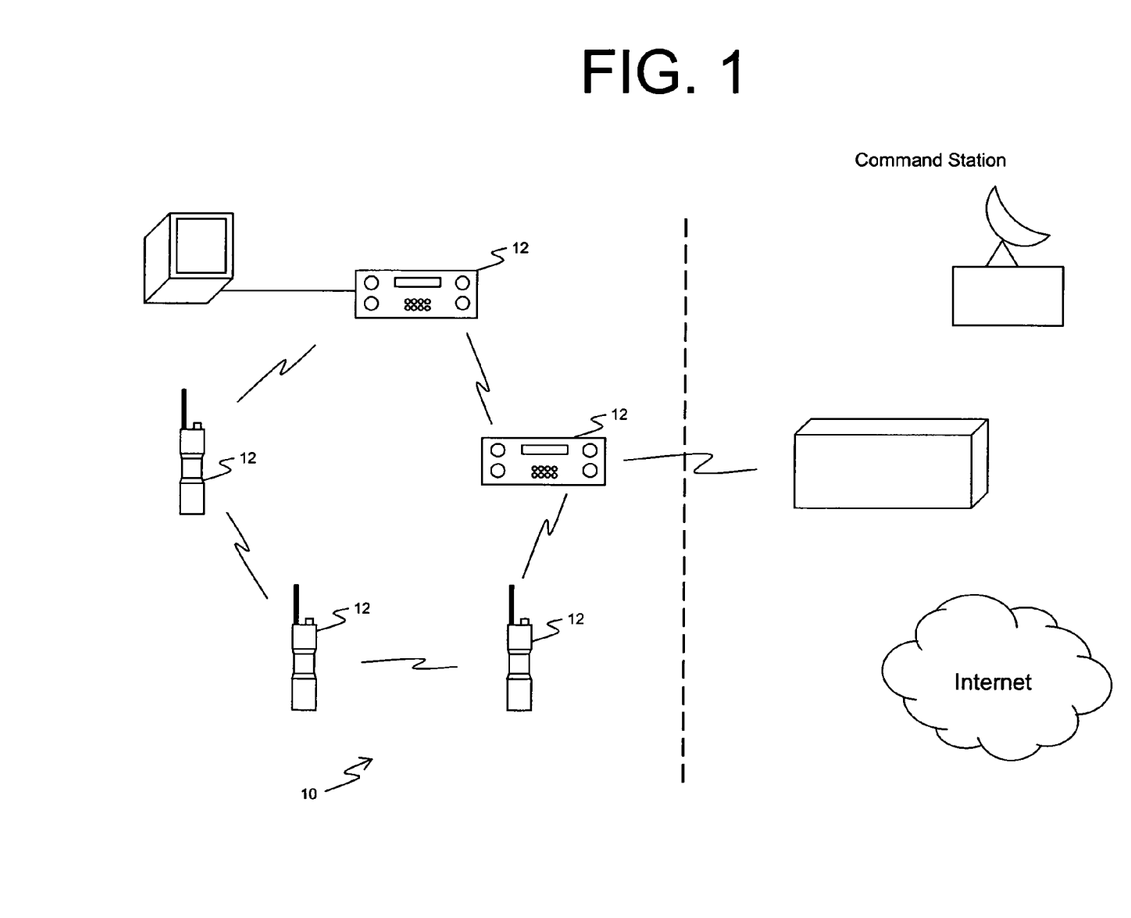
FIG. 1 is a diagram of an exemplary radio communication system.

FIG. 1 is a diagram of an exemplary radio communication system 10. The radio communication system 10 is generally comprised of multiple tactical radios 12 communicating amongst themselves and, possibly, with a command station 14. Exemplary tactical radios may include a handheld radio or a manpack radio from the Falcon III series of radio products commercially available from Harris Corporation. Other types of radios are also contemplated by this disclosure. Moreover, this disclosure contemplates other types of wireless communication devices.

The command station 14 includes at least one radio for communicating with the other radios 12. The command station 14 may also serve as a gateway to other remote communication devices and/or other remote networks. For instance, the command station may interface with a packet-based network, such as the Internet, or may support a satellite communication link. In any case, packet-based voice messages received at the command station may be routed to some remote destination. While the following description is provided with reference to radio communications, it is understood that this disclosure is applicable to other types of secure voice communication systems.

Figure 2:
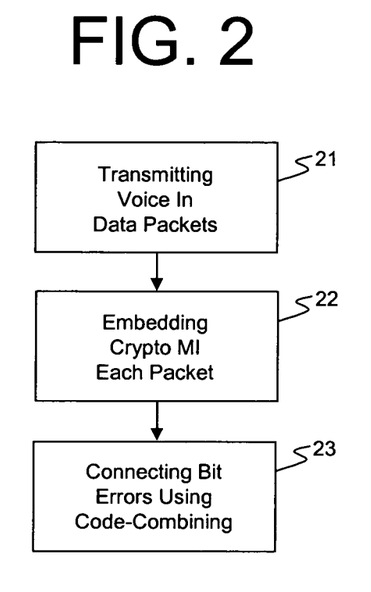
FIG. 2 is a high level flowchart illustrating a method for securely transmitting voice data in a voice communication system.

FIG. 2 provides an overview of a method for securely transmitting voice data in a voice communication system. As a starting point, the voice data is to be transmitted 21 in a packet-based format and thus each voice message will be spread amongst a plurality of data packets. In addition, the data packets will be encrypted to ensure secure transmission. In a conventional approach, a single cryptographic message indicator was associated with a voice message. To decrypt the data packets, the message indicator must be received error free at the packet receiver. This can be a challenge in a tactical operating environment of a military radio.

To address this concern, this disclosure proposes that a cryptographic message indicator be embedded 22 into each of the data packets used to transmit a voice message. By placing the message indicator in each data packet, the receiver can pick up the voice message even if transmission of the first few data packets is lost. Accordingly, crypto synchronization can be achieved at different points in the message stream and once achieved maintained throughout the duration of the message.

Code-combining is then used at the packet receiver to correct 23 for bit errors in the cryptographic message indicator. In order to comply with the requirements of a Type I cryptographic system as defined by the National Security Agency, the cryptographic message indicator must be unique across each of the data packets. An innovative technique for code-combining the bits which comprise the message indicator while altering the message indicator for each data packet is further described below. However, the broader aspects of this disclosure, including correcting for bit errors in the message indicator through the use of code-combining, are not limited to Type I cryptographic systems.

Figure 3:
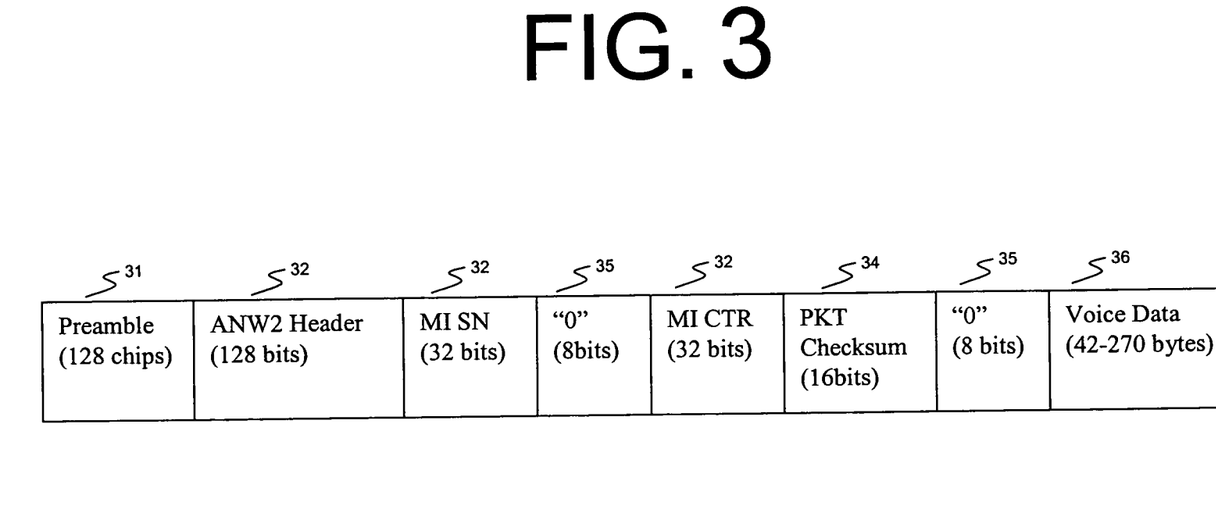
FIG. 3 is a diagram of an exemplary data packet employed in this disclosure.

An exemplary voice packet is shown in FIG. 3. The data packet is generally comprised of a header which marks the beginning of the packet, a payload which contains the voice data to be carried in the packet; and a trailer which marks the end of the packet. The packet header includes a preamble 31, packet routing data 32, the cryptographic message indicator 33 and a checksum 34. The preamble 31 is a known sequence of bits sent at the start of a message which the packet receiver uses to synchronize to its internal clock. Packet routing data 32 is network protocol information which is used to route the packet within the communication system. In an exemplary embodiment, the packet routing data may be defined in accordance with a network layer protocol such as the Internet Protocol. Other protocols are also contemplated.

The cryptographic message indicator 33 is defined to be unique across all of the nodes in the communication system. In an exemplary embodiment, the cryptographic message indicator 33 is an identifier for the packet transmitter (e.g., a serial number associated with a cryptographic engine) concatenated with a count sequence that is maintained by the packet transmitter. The count sequence is incremented each time a data packet is encrypted using the cryptographic key and initialized to zero only upon installation of a new cryptographic key. In this way, the cryptographic message indicator adheres to the requirements of a Type I cryptographic system. In an alternative embodiment, the count sequence may remain fixed for each voice message. The encoding and decoding processes described below are easily modified to account for this embodiment.

On either side of the count sequence, zero data 35 is preferably formatted in the packet to allow updating of the code-combining history. The packet header further includes a checksum for the packet routing data and the cryptographic message indicator. It is understood that other packet formats are within the scope of this disclosure.

Voice data is formatted into the payload portion 36 of the data packet. In an exemplary embodiment, the voice data may be compressed using a mixed excitation linear prediction (MELP) algorithm. In this case, the voice packet consists of six speech frames of data at 22.5 ms per frame for a total of 42 bytes per epoch. Each frame of data is an octet aligned such that 54 bits fit into seven bytes. It is understood that other voice coding techniques, such as continuously variable slope delta modulation (CVSD), are within the scope of this disclosure.

Figure 4:
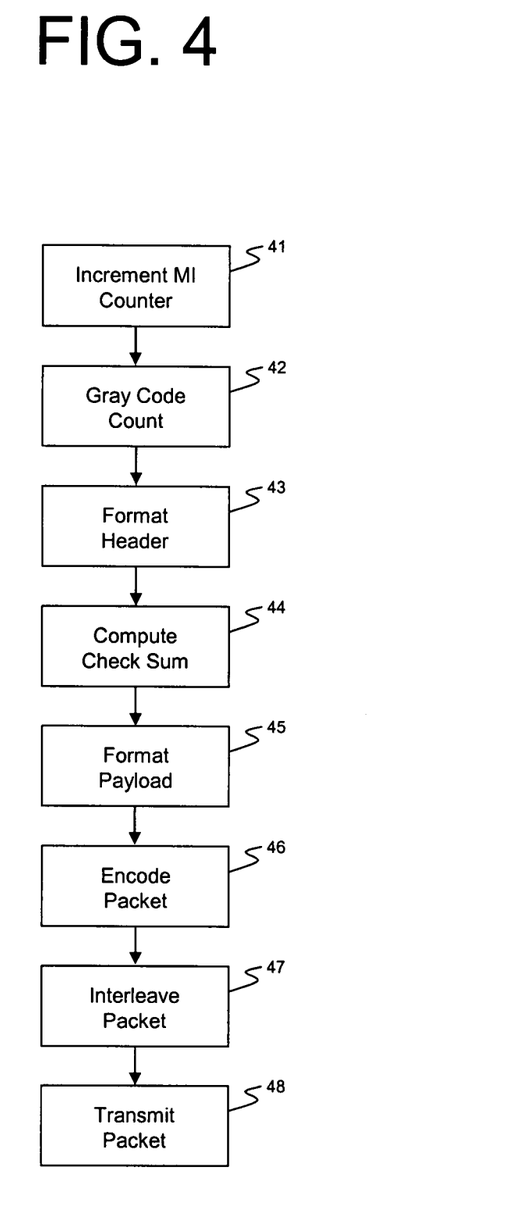
FIG. 4 is a flowchart for an exemplary method for transmitting data packets in a secure voice communication system.

FIG. 4 illustrates an exemplary method for transmitting data packets in a secure voice communication system. A count sequence is maintained by each transmitter in the system. Each time a data packet is formatted from transmission, the count sequence is incremented by one as indicated at 41. In addition, the count sequence may be Gray coded at 42. Gray code or reflected binary code is a binary numeral system where two successive values differ in only one digit. Gray coding may be optionally employed to prevent the code-combining history from changing signs too frequently.

Given the count sequence, the packet header may be formatted at 43. The cryptographic message indicator is formed by appending the unique identifier for the transmitter with the count sequence. A checksum is also computed 44 for the header portion of the data packet. In a preferred embodiment, the checksum covers the packet routing data and the cryptographic message indicator, but excludes the preamble portion of the header. It is readily understood that different checksum methods can be used as well as other types of redundancy check schemes. The computed checksum is then placed into the packet header.

To complete packet formatting, the payload portion of the packet is formatted 45 with the voice data. As noted above, the voice coding scheme, such as MELP, may be employed to compress to the voice data. In such cases, the voice coding would occur prior to the voice data being placed into the data packet.

The data packet can then be encoded at 46 by a suitable encoder. In an exemplary embodiment, the bits of the data packet are feed into a convolutional encoder, such as a Viterbi encoder. The encoded data stream may be optionally punctured to create different code rates (e.g., 1/2 rate, 2/3 rate, 3/4 rate, etc.). In order to code-combine, it is necessary to prevent data from a previous stage from filling through the tail bits of the encoder. Puncturing a convolutional code results in a fixed pattern of "skipping" various bits from the encoder stream. On the decoder side, these bits are reinserted as zero soft decision values. The convolutional code state is typically initialized to zero before the encoder begins encoding bits. A typical Viterbi decoder uses this fact in the decoding process to trace back the trellis. In order to pick up in the middle of the encoder stream, one must know the past history on the decoder. The invention inserts zero into the encoded data stream to ensure that the decoder knows the state to properly decode the data stream. The bits of the encoded data packet may also be interleaved as indicated at 47. Lastly, the data bits are forwarded to a modem at 48 for transmission from the transmitter. Psuedo code for the exemplary transmission process is found in the appendix below. It is to be understood that only the relevant steps of the methodology are discussed in relation to FIG. 4, but that other steps may be needed to transmit voice data from the transmitter.

Figure 5:
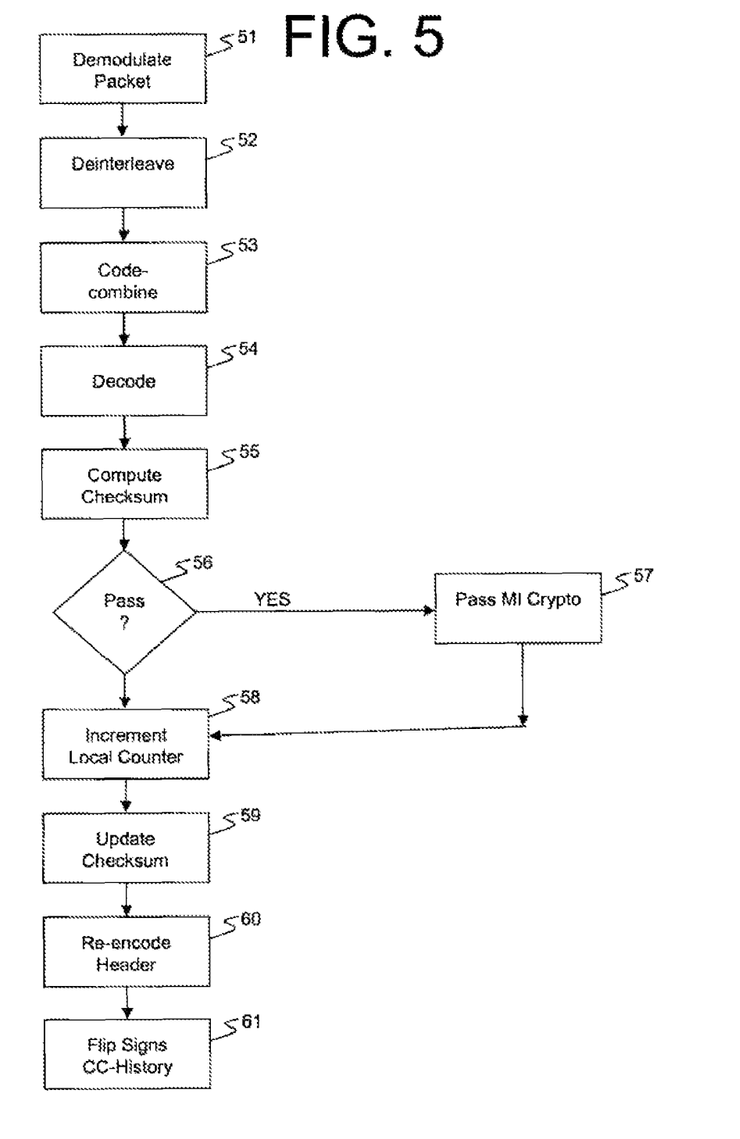
FIG. 5 is a flowchart for an exemplary method for decoding data packets in a secure voice The drawings described herein are for illustration purposes only and are not intended to limit the scope of the present disclosure in any way.

FIG. 5 illustrates an exemplary method for decoding data packets at a packet receiver residing in the secure voice communication system. First, the received data bits are demodulated at 51 into a plurality of bit soft-decisions. Likewise, it is understood that only the relevant steps of the decoding process are discussed below, bit other steps may be needed to decode the data received at the packet receiver.

Code-combining is used at 53 to correct for bit errors in the packet header. Code-combining is generally defined as a weighted combination of soft-decisions from a decoder over multiple observations. In an exemplary embodiment, code-combining is used to correct for bit errors found in the packet routing data and the cryptographic message indicator. Soft-decisions associated with the packet routing data and the cryptographic message indicator are code-combined with bit soft-decision from previously received data packets to form a code-combining history: $CC[i+1]=CC[i]+SNR[i] * $ current soft decision$[i]$. In this example, soft-decisions are weighted with the signal-to-noise measure at which the data packet was received. Other weighting metrics are also contemplated. Since code-combining is applied across a plurality of bits, the code-combining history is in the form of a one-dimensional array.

Incoming data bits are then decoded 54 using a suitable decoder. For each data packet, the code-combining history is input to the decoder along with the soft-decisions associated with voice data from the packet payload. If applicable, the data bits may have been deinterleaved 52 prior to being code-combined.

To confirm accuracy of the decoding, a redundancy check (e.g., cyclic redundancy check) is performed on the decoded data bits. In the exemplary embodiment, a checksum is computed 55 for the packet routing data and the cryptographic message indicator. This header data is assumed to be error free when the computed checksum matches the checksum value in the packet header.

When the redundancy check passes, the decoded cryptographic message indicator and the voice data are passed at 57 along to the cryptographic engine. Regardless of whether the redundancy check passes or fails, the code-combining history needs to be updated in order to process the next data packet. Specifically, the count sequence value is extracted from the decoded packet data and incremented by one at 58. The decoded checksum is updated 59 using the incremented count sequence value. In the case the count sequence is Gray coded, the incremented count sequence value will need to be Gray coded prior to updating the checksum. Data comprising the code-combining history is then encoded 60 using the same encoding scheme as employed at the transmitter. In the exemplary embodiment, the code-combining history correlates to the packet routing data, the cryptographic message indicator and the checksum. Lastly, signs are flipped 61 at the necessary locations in the code-combining array to account for the incremented count sequence and corresponding checksum value. In this way, the code-combining history will converge to the correct value. Once the current voice message is complete, the code-combining history is initialized to zero in preparation for the next message.

The above description is merely exemplary in nature and is not intended to limit the present disclosure, application, or uses.

APPENDIX

```
// Generate the Transmit Burst Waveform
// (1) Pull in the header and MI data on every data packet.
// ANW2 IP/Subnet information (128 bits)
// Crypto serial number (32 bits)
// ANW2 + MI = 160 bits = ten 16 bit words
    for(j=0;j<10;j++)txDataWord[j] = (Uint16)HeaderData[j];
// (2) The next lines represent a simple XOR checksum, note any checksum method
// could be used here.
    txcrc=0;
    for(j=0;j<10;j++)
        txcrc ^= txDataWord[j];
// (3) Include the count value in the checksum.
    txcrc ^= (Uint16)(txVcounter & 0x0000ffff);
    txcrc ^= (Uint16)((txVcounter>>16) & 0x0000ffff);
// (4) Gray code the count value so that only one bit at a time changes state
// as the the count increments every epoch
    txDataWord[10] = (Uint16)((GrayCodeCount(txVcounter)<<8) & 0xff00);
    txDataWord[11] = (Uint16)((GrayCodeCount(txVcounter)>>8) & 0xffff);
    txDataWord[12] = (Uint16)((GrayCodeCount(txVcounter)>>24)
                              | ((txcrc<<8)&0xff00));
// (5) Store the 16 bit checksum in the data packet
    txDataWord[13] = (Uint16)(txcrc>>8);
    // Add MELP voice to packet (use random data for simulation purposes)
    for(j=14;j<35;j++)txDataWord[j] = (Uint16)random(65536);
// (6) Initialize the Viterbi Encoder state to zero on every packet
    InitViterbiEncoder( );
// (7) Encode, puncture, and provide encoder tail bits
    ViterbiEncodeBlock(txDataWord,
                       txOnAirBit,
                       numTxBits,
                       coded);
// (8) Interleave and pack the encoded packet
    InterleaveAndBitPackArray(txOnAirBit,
                       txOnAirWord,
                       fec_num_tx_bits,
                       1);
// (9) Call the modem process to generate preamble and waveform containing
// fec_num_tx_bits worth of data from the array txOnAirWord.
// (10) Update the Count sequence, Note that this data actually comes from the
// Crypto but is here to understand the processing.
    txVcounter++;
// (11) If we done with the present Burst Voice message goto 12
// else goto 1
// (12) TX Burst Processing Complete
/*********************************************************************/
/*********************************************************************/
// Receive Voice Processing
// (1) Demodulate receive burst and generate soft-decisions and write them into
// phy_modem_rx_soft_decision_buffer array
// (2) Scale and clamp Soft Decisions from phy_modem_rx_soft_decision_buffer
// and De-interleave output into array phy_modem_rx_soft_decision.
    PhyModemWalshSymbolComputeSoftDecision( );
// (3) Add the current soft-decisions (except voice portion) into the
// code-combining array with saturation for this epoch.
    for(j=0;j<299;j++)
    {
        if((int)CC[j]+(int)phy_modem_rx_soft_decision[j] > 32767L)
            CC[j] = 32767;
        else if((int)CC[j]+(int)phy_modem_rx_soft_decision[j] < -32767L)
            CC[j] = -32767;
        else
            CC[j] += phy_modem_rx_soft_decision[j];
```

APPENDIX-continued

```
   }
// (4) Locate the largest code-combining bit
   big = 0;
   for(j=0;j<299;j++)
   {
      if(abs(CC[j]) > big)big=abs(CC[j]);
   }
// (5) Determine the number of shifts necessary to scale and fit big into byte
// location
   shift = 0;
   while(big > 127)
   {
      shift++;
      big = big >> 1;
   }
// (6) Scale CC array to fit into byte array
   for(j=0;j<299;j++)
      phy_modem_rx_soft_decision[j] = (CC[j]>>shift);
// (7) Viterbi Decode 3/4 rate code
   DecodeRateThreeFourthsCode(void);
// (8) Extract grey count value from Viterbi decoded data
   Vcounter = (rxDataWord[10]>>8);
   Vcounter = Vcounter | (((Uint32)rxDataWord[11])<<8);
   Vcounter = Vcounter | (((Uint32)rxDataWord[12])<<24);
   Vcounter = InvGrayCodeCount(Vcounter);
// (9) Extract receive PKT CRC
   rxcrc   = (rxDataWord[13]<<8) | (rxDataWord[12]>>8);
// (10) Compute simple checksum of receive PKT
   calc_rxcrc = 0;
   for(j=0;j<10;j++)calc_rxcrc ^= rxDataWord[j]; // don't include count!
// (11) If rxcrc = calc_rxcrc, we can start sending data to crypto decryption
// and voice playback.
   if(rxcrc == calc_rxcrc)
   {
      // Send RX data to MAC for delivery to Crypto
      for(j=0;j<35;j++)MAC_Data[j] = rxDataWord[j];
   }
// (12) Re-encode the counter sequence and update CC history for next epoch.
// We do this process even if we do not receive a modem burst
// (epoch synchronous task).
   ReEncodeCounter( );
// (13) If we are done with the current voice message goto 14
// else goto 1
// (14) Zero the code-combining array now that the current voice message is
// completed
   for(j=0;j<299;j++)
      CC[j] = 0;
// (15) Receive Voice Processing Completed
/***********************************************************************/
// The following function is used during the receive code-combining
// processing below.
void ReEncodeCounter(void)
{
   Uint16 in[56];
   Uint16 out[75];
   Int16 i,j;
   Uint16 temp;
   Uint16 tempS;
   Uint32 tempL;
// (1) Update counter for next time
   Vcounter++;
// (2) Gray code the count value
   tempL = GrayCodeCount(Vcounter);
// (3) Create a bit array of encoded data
   for(j=0;j<32;j++)
   {
      in[j] = tempL & 1;
      tempL = tempL >> 1;
   }
// (4) Use the last decoded calcultate checksum
   tempS = calc_rxcrc;
// (5) Update checksum to include the new count value
   tempS ^= (Uint16)(Vcounter & 0x0000ffff);
   tempS ^= (Uint16)((Vcounter>>16) & 0x0000ffff);
// (6) Place bits into bit array
   for(j=0;j<16;j++)
   {
      in[j+32] = tempS & 1;
      tempS = tempS >> 1;
   }
```

APPENDIX-continued

```
// (7) Flush encoder with 8 bit zero data
   for(j=0;j<8;j++)in[j+48] = 0;
// (8) Encode and puncture the new data into the out array
   for(j=0;j<18;j++)
   {
      temp = ViterbiEncodeData(in[j*3 + 0]);
         out[j*4+1] = temp & 1;
         out[j*4+0] = temp >> 1;
      temp = ViterbiEncodeData(in[j*3 + 1]);
      out[j*4+2] = temp & 1;
      temp = ViterbiEncodeData(in[j*3 + 2]);
         out[j*4+3] = temp >> 1;
   }
// (9) Complete the last three output bits
   temp = ViterbiEncodeData(in[54]);
   out[73] = temp & 1;
   out[72] = temp >> 1;
   temp = ViterbiEncodeData(in[55]);
   out[74] = temp & 1;
// (10) Flip the sign of the code-combining array at the necessary locations.
// This process allows us to code-combine data that is changing every frame,
// while still integrating energy to overcome channel errors.
   for(j=0;j<75;j++)
   {
      if(out[j] == 0)
      {
         // CC needs to be positive
            if(CC[j+224] < 0)CC[j+224] = -CC[j+224];
      }
      else
      {
         // CC needs to be negative
            if(CC[j+224] >= 0)CC[j+224] = -CC[j+224];
      }
   }
}
/************************************************************/
```

What is claimed is:

1. A method for transmitting voice data in a secure communication system, comprising:
   transmitting voice data using a plurality of data packets, where the voice data is spread amongst the plurality of data packets;
   embedding a cryptographic message indicator into a packet header of each of the plurality of data packets used to transmit the voice data;
   demodulating data packets from the plurality of data packets received at a packet receiver into a plurality of bit soft-decisions;
   code-combining bit soft-decisions from only the cryptographic message indicator from a given data packet of the plurality of data packets received at the packet receiver with bit soft-decisions for the cryptographic message indicator from previously received data packets of the plurality of data packets to form a code-combining history;
   decoding the code-combining history at the packet receiver to derive the cryptographic message indicator; and
   decoding, at the packet receiver, the bit soft-decisions associated with the voice data in the plurality of data packets without the use of code-combining.

2. The method of claim 1 further comprises defining a unique cryptographic message indicator for each communication node in the communication system, where the cryptographic message indicator includes a sequence counter that increments for each data packet encrypted using the cryptographic message indicator.

3. The method of claim 2 further comprises defining the cryptographic message indicator as an identifier for the packet transmitter concatenated with the sequence counter.

4. The method of claim 1 further comprises defining a unique cryptographic message indicator for each communication node in the communication system, where the cryptographic message indicator includes a sequence counter that increments for voice message while remaining fixed for data packets which comprised the voice message.

5. The method of claim 1 wherein code-combining further comprises weighting the bit soft-decisions with a signal-to-noise measure at which the data packet was received.

6. The method of claim 1 further comprises:
   decoding a data packet using the code-combining history and the bit soft-decisions associated with the voice data;
   performing a redundancy check on the decoded cryptographic message indicator in the data packet; and
   passing the decoded cryptographic message indicator to the cryptographic engine when the decoded cryptographic message indicator passes the redundancy check.

7. A method for transmitting voice data in a secure communication system, where the voice data is spread amongst a plurality of data packets, comprising:
   demodulating an encoded data packet from the plurality of data packets into a plurality of bit soft-decisions, the data packet having a cryptographic message indicator in a header of the data packet and voice data encrypted in a payload of the data packet;
   code combining bit soft-decisions from only the cryptographic message indicator with bit soft-decisions from data packets in the plurality of data packets previously received to form a code-combining history, wherein the bit soft-decisions from the cryptographic message indicator are weighted with a signal-to-noise measure at which the data packet was received;

decoding the code-combining history using a convolutional decoder;

passing the decoded cryptographic message indicator to a cryptographic engine; and decoding the bit soft-decision associated with the voice data.

8. The method of claim 7 further comprises code combining the bit soft-decisions associated with a checksum for the packet header.

9. The method of claim 7 further comprises performing a redundancy check on the decoded cryptographic message indicator and passing the decoded cryptographic message indicator to the cryptographic engine when the decoded cryptographic message indicator passes the redundancy check, wherein a checksum for the cryptographic message indicator is embedded in the header of the data packet.

10. The method of claim 9 further comprises:

extracting the sequence count from the decoded data packet;

incrementing the sequence count by one;

updating the sequence counter of the cryptographic message indicator using the incremented sequence count;

encoding the packet routing data and the updated cryptographic message indicator: and flipping signs of the code-combining history to account for the updated sequence counter.

11. A method for transmitting voice data in a secure communication system, where the voice data is spread amongst a plurality of data packets, comprising:

demodulating an encoded data packet into a plurality of bit soft-decisions, the data packet having packet routing data and a cryptographic message indicator in a header of the data packet and voice data in a payload of the data packet;

code combining bit soft-decisions from only associated with the packet routing data and the cryptographic message indicator with bit soft-decision previously received data packets to form a code-combining history;

decoding the code-combining history and the bit soft-decisions associated with the voice data;

performing a redundancy check on the decoded cryptographic message indicator; and passing the decoded cryptographic message indicator to the cryptographic engine when the decoded cryptographic message indicator passes the redundancy check.

12. The method of claim 11 wherein the cryptographic message indicator is comprised of an identifier for the packet transmitter concatenated with a sequence counter that increments for each data packet encrypted by the packet transmitter.

13. The method of claim 11 wherein the cryptographic message indicator is comprised of an identifier for the packet transmitter concatenated with a sequence counter that increments for each voice message while remaining fixed for data packets which comprised the voice message.

14. The method of claim 12 further comprises code combining the bit soft-decisions associated with a checksum for the packet routing data and the cryptographic message indicator.

15. The method of claim 13 further comprises incrementing a local counter on the packet receiver based on the sequence counter from the decoded data packet;

updating the sequence counter of the cryptographic message indicator using the incremented local counter;

updating the checksum using the updated sequence counter;

encoding the packet routing data and the cryptographic message indicator; and flipping signs of the code-combining history to account for the updated sequence counter.

16. The method of claim 14 further comprises Gray coding the updated sequence counter prior to updating the checksum.

17. The method of claim 11 further comprises deinterleaving the plurality of bit soft decisions prior to decoding the data packet.

18. The method of claim 11 further comprises decoding the data packet using a Viterbi decoder.

19. The method of claim 11 further comprises performing a cyclic redundancy check on the decoded cryptographic message indicator.

20. The method of claim 11 further comprises decrypting the voice data in the data packet with the use of the decoded cryptographic message indicator.

21. The method of claim 11 further comprises initializing code-combining history upon receipt of a voice message.

* * * * *